March 24, 1942.   A. G. FELDMAN   2,277,583
BABY CARRIAGE
Filed May 6, 1940     3 Sheets-Sheet 2
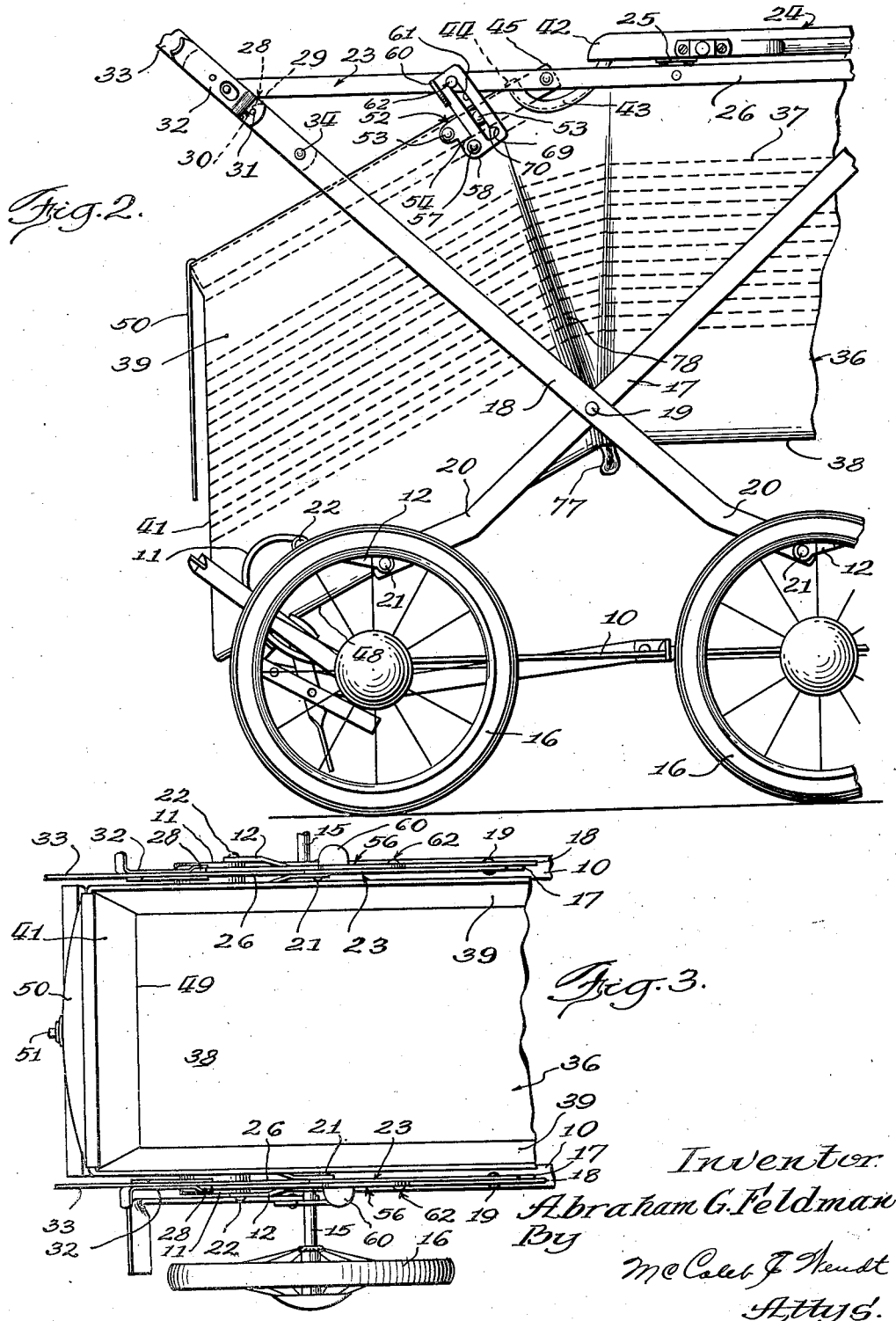
Inventor
Abraham G. Feldman
By
McCaleb & Wendt
Attys.

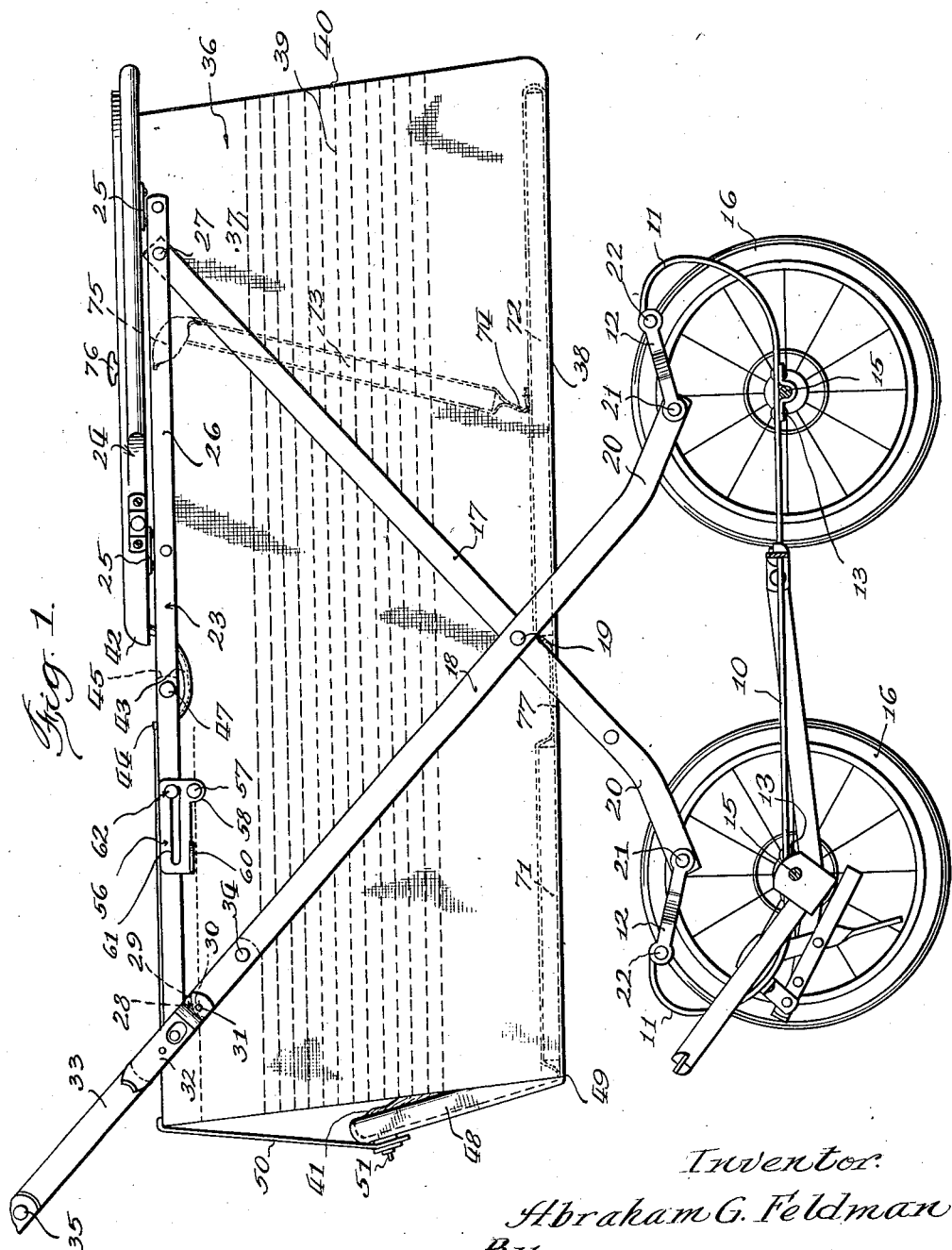

March 24, 1942.   A. G. FELDMAN   2,277,583
BABY CARRIAGE
Filed May 6, 1940   3 Sheets-Sheet 3
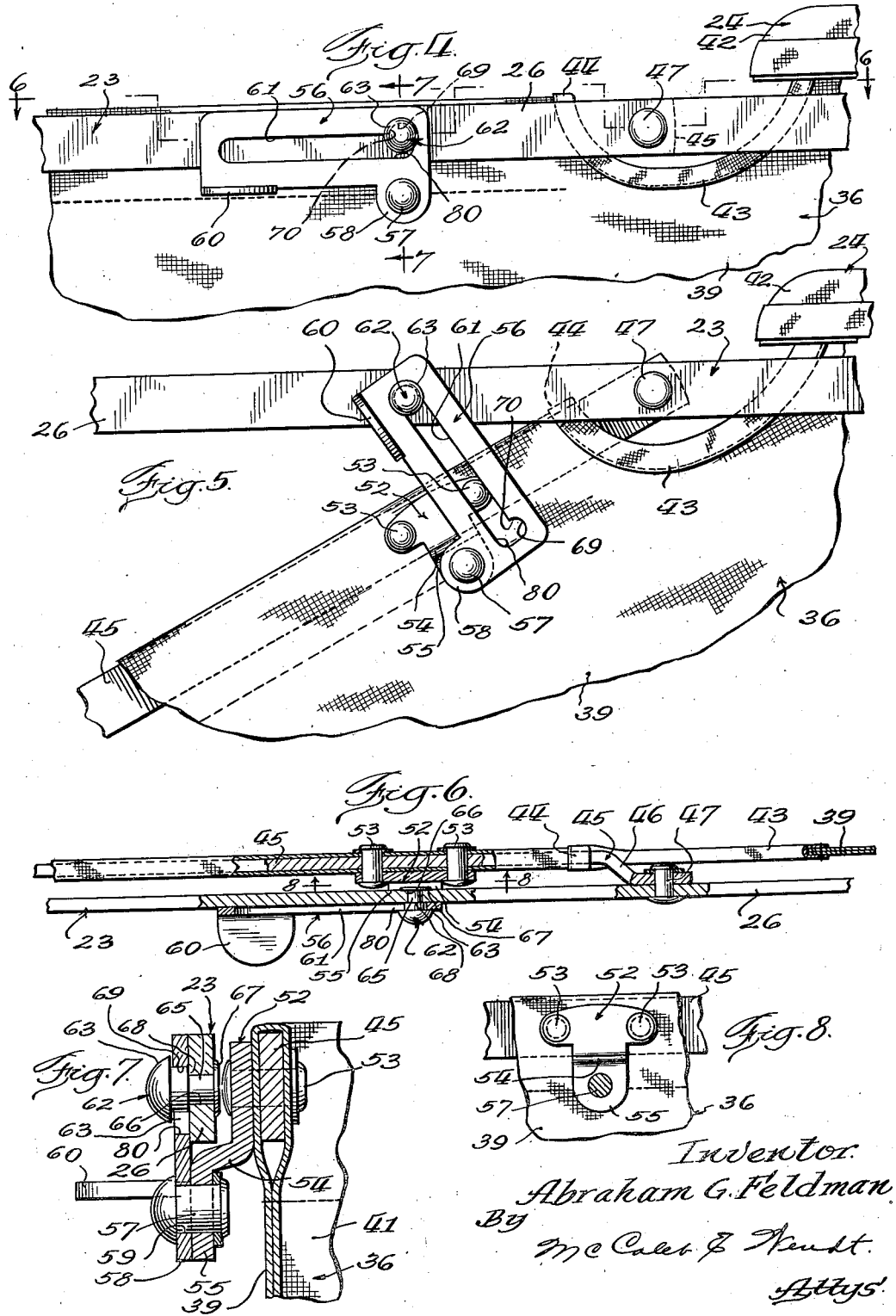

Patented Mar. 24, 1942

2,277,583

UNITED STATES PATENT OFFICE 2,277,583

BABY CARRIAGE

Abraham G. Feldman, Chicago, Ill., assignor to Storkline Furniture Corporation, Chicago, Ill., a corporation of Illinois Application May 6, 1940, Serial No. 333,484

2 Claims. (Cl. 280—41)

The present invention relates to baby carriages, and is particularly concerned with improved basket structures for baby carriages of the collapsible type.

One of the objects of the invention is the provision of an improved drop basket structure for baby carriages of the collapsible type, which is adapted to be held positively in its uppermost position in such manner that there is no possibility of its accidental release, and which may be very conveniently lowered to a second position in which the occupant may sit with feet in a lowered position.

Another object of the invention is the provision of an improved drop basket structure having a positive latching device that requires actuation by both of the hands of the operator for the lowering of the basket, but which is automatic in securing the basket when the basket is raised.

Another object of the invention is the provision of an improved drop basket structure which may be manufactured very economically, so that it may be placed within the means of a larger number of purchasers.

Another object of the invention is the provision of an improved drop basket structure which involves a simple pattern for the flexible basket, and which may be manufactured with a minimum amount of waste.

Referring to the three sheets of drawings accompanying the specification:

Fig. 1 is a side elevational view of a baby carriage constructed according to the present invention, with the drop basket in its uppermost position;

Fig. 2 is a fragmentary elevational view of the same carriage, with its drop basket in the lowermost position;

Fig. 3 is a fragmentary top plan view of the structure of the drop basket;

Fig. 4 is a fragmentary elevational view of the latching mechanism for the drop basket;

Fig. 5 is a view similar to Fig. 4, with the latch in another position;

Fig. 6 is a fragmentary sectional view, taken on the plane of the line 6—6 of Fig. 4;

Fig. 7 is a sectional view, taken on the plane of the line 7—7 of Fig. 4;

Fig. 8 is a sectional view, taken on the plane of the line 8—8 of Fig. 6.

Referring to Fig. 1, the baby carriage constructed according to the invention may be provided with a chassis having a pair of longitudinally extending springs 10, of similar shape, each of which has each end upwardly and inwardly turned at 11, and secured to the shackles 12.

Each of the springs 10 supports a pair of bearing brackets 13 for securement to a pair of axles 15, which carries the wheels 16.

The collapsible framework of the carriage comprises a pair of scissors members 17 and 18 on each side of the carriage, these scissors members being pivotally secured together by a rivet at 19 intermediate their ends.

The scissors members are turned outwardly at 20 near the lower end, and are pivotally secured at 21 to the spring shackles, which in turn are pivoted to the springs at 22.

The upper ends of the collapsible mechanism are secured to a basket supporting frame, indicated in its entirety by the numeral 26, which may include a substantially U-shaped wooden frame member 24, having a plurality of angle brackets 25 secured thereto and supporting a pair of longitudinally extending metal frame members 23.

At the front end of the carriage the ends of the scissors members 17 are pivotally secured to these frame members 26 on both sides of the carriage, at the points 27, by a rivet or other suitable securing means.

The scissor member 18 on each side of the carriage is shorter than the member 17, and extends to the end 28, where it is provided with a camming surface 29 and a slot 30 for receiving a latching member 31 carried by a latching slider 32.

The latching slider is carried by a lever extension 33, which is pivotally secured by a rivet at 34 to the scissor member 18 on each side of the carriage. The extension lever 33 is joined by a substantially U-shaped tubular handle member 35, not shown in detail; and the handle 35 is adapted to fold over toward the right in Fig. 1, when the latching members 32 are released by being pulled upward to collapse the carriage.

The flexible basket 36 comprises a flexible fabric member, which may be built out of double layers of suitable fabric, such as imitation leather, having the face side of the fabric turned outward on the outer layer and inward for the inner layer.

These two layers of fabric are preferably padded with suitable layers of cotton or other quilting material, and are stitched together along a multiplicity of parallel lines of stitching 37, for the purpose of improving the appearance, and for maintaining the quilting in predetermined position.

The flexible basket is similar in appearance upon both sides, and it includes a bottom 38, a pair of similar sides 39, and a pair of ends 40, 41. In order to increase the length of the basket, the sides 39 may be substantially trapezoidal in shape, being longer at the bottom than they are at the top. The ends, sides and bottom are firmly stitched together, and at the front end of the carriage the basket is supported by being secured on the inside of the wooden frame 24 by a plurality of upholstery tacks, screws, or other suitable securing means.

At the ends 42 of the wooden frame, the flexible basket is provided at the top with a finished edge portion 43, which is unsupported for a short distance, but the edge of the basket from the point 44 down to the end of the basket, across the end and across to the point 44, on the other side, is preferably provided with a loop for the reception of a metallic drop basket frame member 45 of substantially U-shape, which is located in this loop at the upper edge of the flexible basket.

The drop basket frame member 45 is provided with an offset at 46 and at 47 has each of its ends pivotally secured to one of the side frame members 26 at a point which is above the unsupported edge 43 of the basket.

The flexible basket 36 may be provided at its rear end with a foldable extension, such as that shown in Fig. 1, the floor of the extension being provided with a relatively stiff floor member, such as a panel 48 of plywood or other light stiff material, which is covered with the fabric, and which is adapted to be folded upward along the line 49.

A flap 50 of the same material is provided with an aperture for receiving the turned fastener 51, carried by the panel 48, and the flap 50 has a grommet which is adapted to receive the fastener 51. Thus, the floor section 48 may be folded upward and secured in the position of Fig. 1 by means of the fastener 51, or it may be extended as shown in Fig. 2.

The drop basket frame 45 is preferably provided with the improved means for securing it in its two positions of Figs. 1 and 2. This securing mechanism is best illustrated in Figs. 4 and 5.

Since the ends of the U-shaped drop basket frame 45 are pivotally secured on the upper frame members 23 at 47, this frame may be moved downward to the position of Fig. 2 or upward to the position of Fig. 1. The drop basket frame 45 may be provided with a pivot bracket 52, comprising a sheet metal member having an attaching flange provided with apertures for receiving the rivets 53, which pass through it through the fabric of the basket, and through the frame member 45.

The bracket 52 is offset at 54 to bring its lower flange 55 into the plane of the latching member 56. The latching member 56 is pivotally secured on flange 55 by means of a suitable rivet 57, passing through both of these members.

The latching member 56 comprises a sheet metal member of substantially rectangular shape, provided with a laterally projecting bearing flange 58, having the aperture 59 for the rivets 57. This rectangular latching member also has an integral finger engaging flange 60, which is bent at substantially right angles to the body of the latching member 56 and located at the lower outer end thereof.

The latching member 56 has a longitudinally extending slot 61 of sufficient width to receive the body of a rivet 62, but this slot is too narrow to pass the head 63 of this rivet. The rivet 62 is preferably provided with a body 65 of reduced cylindrical cross section secured in an aperture 66 in the frame member 26, so that the frame member is clamped between the rivet end 67 and the annular portion 68. Thus the rivet 62 may be fixedly mounted on the frame member 26 without any chance of binding against the latching member 56, with which it has a suitable clearance.

The slot 61 in the latching member 56 communicates at its lower end (Fig. 5) or right hand end (Fig. 4), with an angularly partially circular extension slot 69. The shoulder 70, which forms a part of the wall of this extension slot 69, is the latch and shoulder for retaining the latch in latched position.

The curved surface indicated at 69 is the latching surface which resists the downward thrust of the drop carriage structure and holds the drop carriage up when the parts are in the position of Fig. 4.

The floor 38 of the carriage is preferably provided with a plurality of sections or panels in addition to the panel 48. These panels may be made of plywood, and are indicated at 71, 72. An upwardly extending panel, also made of plywood and covered with the same fabric, is indicated at 73. It is secured to the floor by means of a flexible connecting piece 74 of the same fabric, so that it will be in proper position to serve as a back support for the occupant.

The panel 73 is secured to the upper frame 26 by a pair of straps 75, having button-hole openings for engagement over the headed members 76. The panels 71, 72 are separated from each other, and the bottom is merely provided with a flexible fabric portion at 77.

The purpose of this is to permit the folding of the bottom at this flexible portion 77, as indicated by the fold 77 in Fig. 2 when the drop basket is moved to its lower position. In this position the side walls 39 of the flexible basket 36 also fold slightly, as indicated at 78 in Fig. 2, and permit suitable movement of the drop basket from the position of Fig. 1 to that of Fig. 2.

Thus it is unnecessary to provide any gores or special patterns for the formation of a drop basket, but the drop basket is an integral part of the flexible basket, and the sides of the basket may be formed out of one sheet of fabric. Of course, the inner layer of the fabric may be of a different material, and where two layers are used two sheets of fabric are required for each side.

The operation of my drop basket is as follows: When the carriage and basket is in the position of Fig. 2, the occupant may sit upon the panel 72, with his back against the panel 73, and the legs will rest on the panel 71, which is supported on an inclined plane, as shown in Fig. 2. The feet may rest against the upwardly turned panel 48, or extend to the end 41 of the basket.

In this position the latching member 56 serves as a link for supporting the drop basket frame 45 from the frame members 26, which also give support to the ends of the drop basket frame 45 by means of the rivets 47.

When it is desired to raise the drop basket, the user may grasp the drop basket frame at its upper left hand end in Fig. 2 and merely raise the drop basket frame. This will cause the links 56 to be moved upward on the rivets 62 and as they are moved upward they will pivot slightly on the rivets 57 until the drop basket reaches its uppermost position, when the latches 56 will be substantially horizontal.

The lower flat side of the slot 61 at the point 80 then serves as a stop surface for engaging the shank of the rivet 62 and preventing further upward movement of the drop basket frame 45.

At this point the force of gravity working on the left end of each of the latching members 56 moves them to the position of Fig. 4, in which the rivet 62 has its body in the circular slot extension 69.

In this position the drop basket is very securely held, and it is necessary not only to lift both of the latching members 56 by means of the finger pieces 60, but it is also necessary to lift the drop basket frame member 45 slightly. This is best done by utilizing both hands, the thumbs engaging inside the drop basket frame 45 opposite the latching members 56, and the fore fingers may then be used to lift the finger pieces 60, while the drop basket frame is elevated. Thereafter the thumbs may release the drop basket frame first, and the drop basket frame 45 will drop, carrying with it the latch 56 to the position of Fig. 5.

When this takes place, the panel 71 has its edge brought up against the edge of panel 72 in the bottom at the time when the latch reaches the position of Fig. 5 and the bottom and sides of the basket fold, as illustrated in Fig. 2.

It will thus be observed that I have invented an improved drop basket structure which is simple, yet positive in its latching function, and this drop basket arrangement may be used without necessity for a special pattern in the flexible basket. There is absolutely no possibility of the latch releasing the drop basket inadvertently because it is necessary not only to raise both of the latches, but to raise the drop basket frame also slightly to give a release of the drop basket.

The mechanism is self-latching when the drop basket is raised, and it is capable of economical manufacture so that the cost of the vehicle embodying this drop basket may be reduced by utilizing this structure.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a drop basket supporting structure, the combination of a pair of longitudinally extending frame members for the top of a baby carriage with a drop basket supporting frame of substantially U shape, having each of its ends pivotally secured on the inside of said longitudinally extending frame members, a basket carried by said longitudinally extending frame members and said drop basket frame, and an offset bracket member carried by each of the legs of said drop basket frame, each comprising a metal member fixedly secured to the outside of said drop basket frame and extending downwardly and outwardly, and provided with a pivot flange extending substantially parallel to said longitudinally extending frame members, a latching member pivotally secured to said parallel flange, and having an elongated slot, said elongated slot engaging a headed pin carried by the respective longitudinally extending frame members on the outer side thereof, said slot being of sufficient length whereby the latching member supports the drop basket in predetermined lowered position, and said slots being spaced from the pivot of said latch relative to the length of said bracket a predetermined amount whereby the pin may be located above said pivot in the opposite end of said slot when the drop basket is supported in elevated position.

2. In a drop basket supporting structure, the combination of a pair of longitudinally extending frame members for the top of a baby carriage with a drop basket supporting frame of substantially U shape, having each of its ends pivotally secured on the inside of said longitudinally extending frame members, a basket carried by said longitudinally extending frame members and said drop basket frame, and an offset bracket member carried by each of the legs of said drop basket frame, each comprising a metal member fixedly secured to the outside of said drop basket frame and extending downwardly and outwardly, and provided with a pivot flange extending substantially parallel to said longitudinally extending frame members, a latching member pivotally secured to said parallel flange, and having an elongated slot, said elongated slot engaging a headed pin carried by the respective longitudinally extending frame members on the outer side thereof, said slot being of sufficient length whereby the latching member supports the drop basket in predetermined lowered position, and said slots being spaced from the pivot of said latch relative to the length of said bracket a predetermined amount whereby the pin may be located above said pivot in the opposite end of said slot when the drop basket is supported in elevated position, said slot being provided with a latching shoulder spaced from said opposite end in position to provide a recess for receiving said pin and holding the latching member in latched position.

ABRAHAM G. FELDMAN.